United States Patent
Kusumoto

(10) Patent No.: US 6,845,381 B2
(45) Date of Patent: Jan. 18, 2005

(54) FILE MANAGEMENT SYSTEM HAVING FUNCTION FOR MANAGING USE STATE OF FILE THAT STORES MOVING PICTURE DATA SUCH AS TELEVISION PROGRAM

(75) Inventor: Tatsuji Kusumoto, Fussa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 609 days.

(21) Appl. No.: 09/850,264

(22) Filed: May 8, 2001

(65) Prior Publication Data

US 2002/0049710 A1 Apr. 25, 2002

(30) Foreign Application Priority Data

Jun. 30, 2000 (JP) ..................................... 2000-197796

(51) Int. Cl.[7] .............................................. G06F 17/30
(52) U.S. Cl. ..................... 707/104.1; 345/835; 345/846
(58) Field of Search .............................. 707/104.1, 10; 709/217; 725/143, 145; 345/810, 835, 846, 719, 723; 700/17

(56) References Cited

U.S. PATENT DOCUMENTS

| 5,050,031 A | * | 9/1991 | Weiley ........................ 360/137 |
| 5,307,173 A | | 4/1994 | Yuen et al. .................. 358/335 |
| 5,687,160 A | * | 11/1997 | Aotake et al. ............ 369/275.3 |
| 5,758,257 A | * | 5/1998 | Herz et al. .................. 725/116 |
| 5,956,716 A | * | 9/1999 | Kenner et al. ................ 707/10 |
| 6,125,428 A | * | 9/2000 | Miyazaki et al. ............ 711/112 |
| 6,166,735 A | * | 12/2000 | Dom et al. .................. 345/749 |

OTHER PUBLICATIONS

Kiyoshi Hoshino et al.; "Television Audiovisual, Recording and Producing Apparatus Using Personal Computer Method of Supplying Power to PC Card, and PC Card", U.S. patent application Ser. No. 09/660,190, filed on Sep. 12, 2000.

* cited by examiner

Primary Examiner—Jack M Choules
(74) Attorney, Agent, or Firm—Finnegan, Henderson, Farabow, Garrett & Dunner, L.L.P.

(57) ABSTRACT

In a file management system of the present invention, in order to efficiently manage a picture recording file that stores moving picture data such as television program, there is provided a property file for storing status information indicating a use state (such as reproduction count or reproduction portion, for example) of the picture recording file. According to the use state of each picture recording file, the status information indicating the use state is stored in the property file. In this manner, for example, when all the image recording file is displayed in a list, the use state of each picture recording file is acquired from the property file, making it possible to clearly present a user with a use state such as "Not reproduced" or "Reproduced".

8 Claims, 6 Drawing Sheets

FIG. 3

|  | FILE1.PTY | FILE2.PTY | FILE3.PTY |
|---|---|---|---|
| DATA | 19990903 | 19990903 | 19990904 |
| START TIME | 21:00 | 23:00 | 19:00 |
| END TIME | 21:30 | 24:00 | 19:54 |
| CHANNEL | 1 | 4 | 8 |
| TITLE | NEWS 9 | ENGLISH CONVERSATION LESSON | SAMPLE VIDEO |
| CATEGORY | NEWS | EDUCATION | VARIETY |
| MOVIE FILE | FILE1.MPG | FILE2.MPG | FILE3.MPG |
| STATUS | RECORDED (NOT REPRODUCED) | REPRODUCING | RECORDED (REPRODUCED) |
| REPRODUCTION COUNT | 0 TIME | 1 TIME | 3 TIMES |
| REPRODUCTION START COUNTER | – | 00:00:00 | 00:00:00 |
| REPRODUCTION END COUNTER | – | – | 00:30:10 |

FIG. 4

FILE MANAGEMENT SYSTEM HAVING FUNCTION FOR MANAGING USE STATE OF FILE THAT STORES MOVING PICTURE DATA SUCH AS TELEVISION PROGRAM

CROSS-REFERENCE TO RELATED APPLICATIONS

This application is based upon and claims the benefit of priority from the prior Japanese Patent Application No. 2000-197796, filed Jun. 30, 2000, the entire contents of which are incorporated herein by reference.

BACKGROUND OF THE INVENTION

The present invention relates a file management system having a function for managing a use state of a file that stores moving picture data such as television program.

In recent years, the performance of a personal computer becomes remarkably higher, and improvement of communication technology or larger capacity of a recording medium becomes significant. With the tendency, some of the recent personal computers each comprise a so-called picture recording function for receiving moving picture data such as television programs distributed via a network, for example, and compressing and encoding such moving picture data by means of an MPEG (Moving Picture Experts Group) system, thereby recording the data in a hard disk unit or the like.

In addition, a personal computer of such type incorporates a device or software having a decode function, and reproduces moving picture data recorded in the hard disk unit or the like.

In general, a file for storing such moving picture data is created in a predetermined directory on a recording medium (such as hard disk unit) specified in advance. Therefore, when a user attempts to reproduce desired moving picture data from among a plurality of moving picture data, the user displays a list of files in that directory, and selects the corresponding file from among these files by using a mouse or a keyboard.

In the meantime, conventionally, with respect to the file created to store such moving picture data, a state of use such as "Not reproduced" or "Reproduced", for example, is not managed at all. Thus, when the aforementioned files in the predetermined direction are displayed in a list, all the files are arranged just uniformly. Namely, in this file list display, the user could not judge easily which file stores moving picture data that is not reproduced or which file stores moving picture data that has been reproduced.

BRIEF SUMMARY OF THE INVENTION

It is an object of the present invention to provide a file management system having a function for managing a use state of a file that stores moving picture data such as television program.

In order to achieve this object, according to the present invention, there is provided a file management system for recording moving picture data in a recording medium, and reproducing the moving picture data from the recording medium, said file management system comprising: a picture recording file creater configured to create a picture recording file which stores a received moving picture data; and a property file creater configured to create a property file which stores a status information according to use state of the picture recording file.

In the file management system of the present invention, since the use state of each picture recording file is managed by a property file, for example, when all the picture recording files are displayed in a list, it becomes possible to use an available icon according to the use state of "Not reproduced" or "Reproduced" for each picture image file.

In addition, only a portion that is not reproduced, for example, is reproduced based on this property file, thereby making it possible to reproduce only such portion that is not reproduced. Conversely, only a reproduced portion is reproduced, thereby making it possible to repeatedly reproduce the same scene.

Further, a picture recording file that is not reproduced and a picture recording file containing a reproduced portion, but containing a portion that is not reproduced are left, making it possible to erase the other picture recording files (namely, picture recording file in which all the moving picture data to be stored has been reproduced) in batch.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view illustrating an operation screen simulating a remote controller displayed by a picture recording and reproduction control unit of the file management system according to the first embodiment of the present invention;

FIG. 4 is a view illustrating the contents of status information recorded in a property file of a file management system according to the first embodiment;

DETAILED DESCRIPTION OF THE INVENTION

Hereinafter, preferred embodiments of the present invention will be described with reference to the accompanying drawings.

(First Embodiment)

Figure 1:
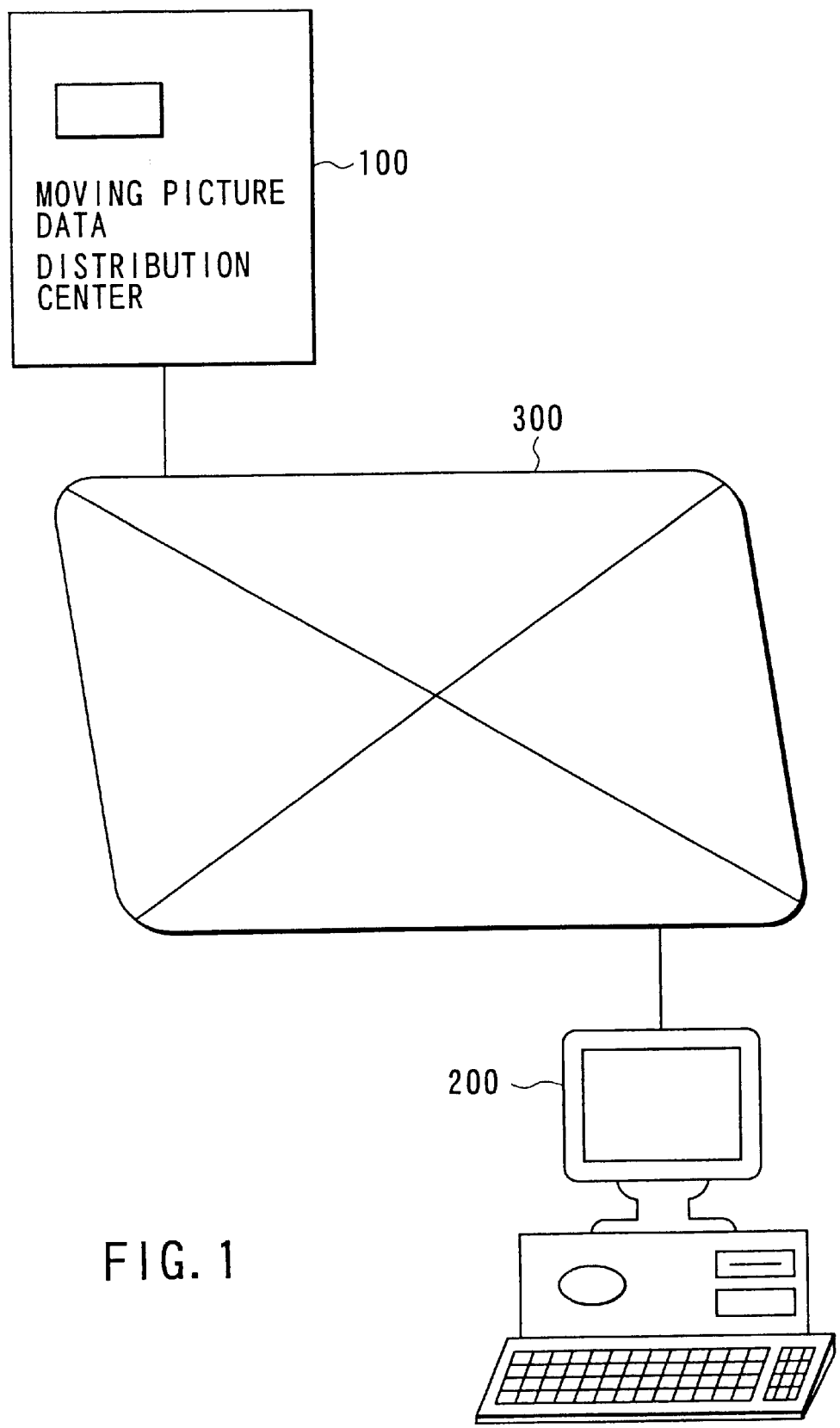
FIG. 1 is a view showing a network configuration of a moving picture data transmission and receiving system to which a file management system according to a first embodiment of the present invention is applied.

First, a first embodiment of the present invention will be described here. FIG. 1 is a view showing a network configuration of a moving picture data transmission and receiving system to which a file management system according to a first embodiment of the present invention is applied.

As shown in FIG. 1, in this moving picture data transmission and receiving system, a moving picture data distribution center 100 and a personal computer 200 are connected to each other via a computer network 300. In addition, the moving picture data distribution center 100 distributes a plurality of moving picture data as a television program in a plurality of channels. On the other hand, the personal computer 200 receives a desired television program from among a plurality of these television programs to be distributed, records such moving picture data in a recording medium such as magnetic disk unit, and reproduces the recorded moving picture data as required.

In addition, the file management system of the present invention is constructed on the personal computer 200 so that the user can manage the moving picture data recorded in this recording medium efficiently.

Figure 2:
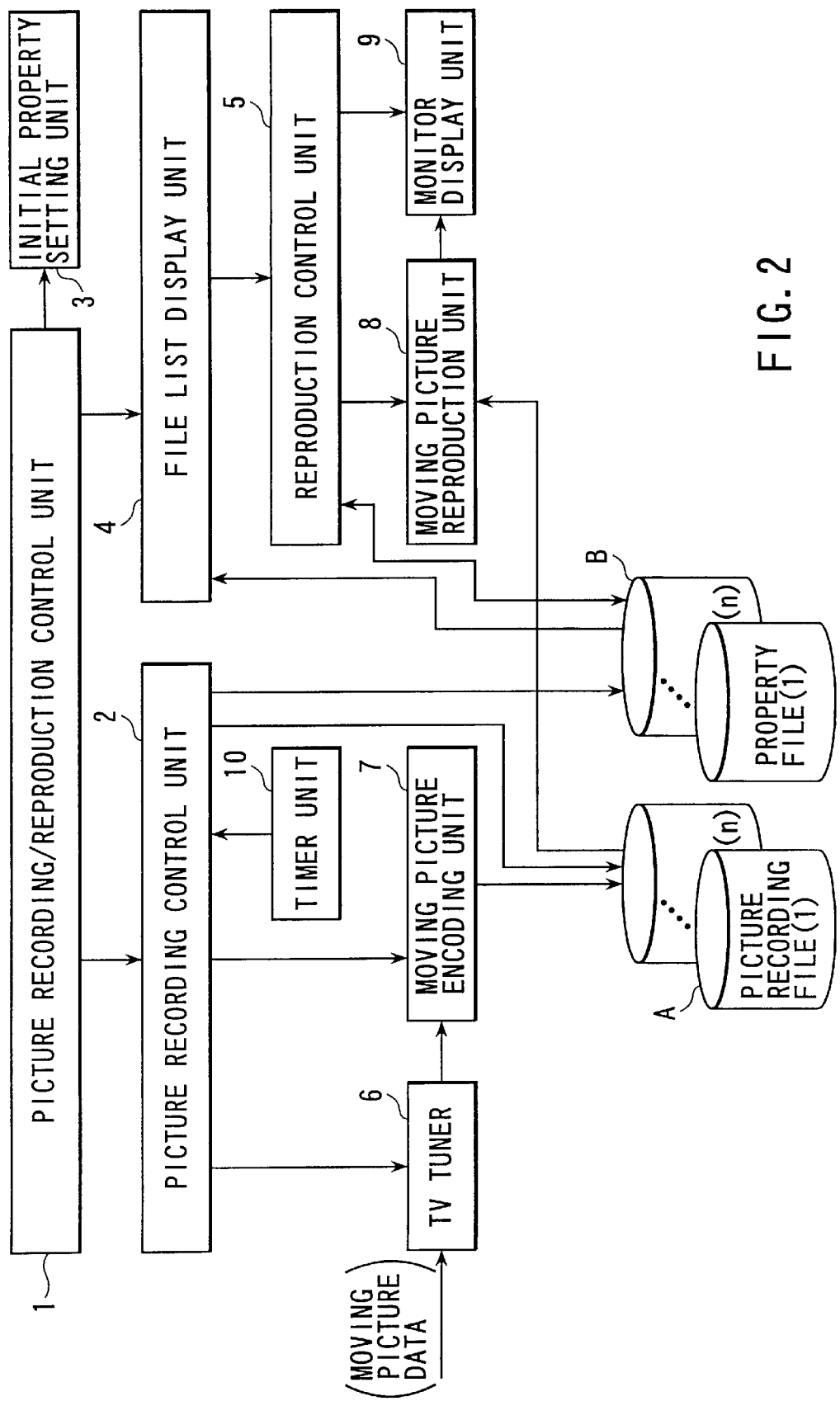
FIG. 2 is a view showing a general configuration of the file management system according to the first embodiment of the present invention.

FIG. 2 is a view showing a general configuration of the file management system according to the first embodiment.

As shown in FIG. 2, this file management system consists of processing unit such as a picture recording/reproduction control unit 1; a moving picture control unit 2; a initial property setting unit 3; a file list display unit 4; a reproduction control unit 5; a television tuner 6; a moving picture encoding unit 7; a moving picture reproduction unit 8; a monitor display unit 9; and a timer unit 10; and data unit such as a moving picture file A and a property file B.

The picture recording/reproduction control unit 1 is a main processing unit that controls picture recording and reproduction of a television program. This control unit covers control of the entire file management system. The picture recording control unit 2 controls the television tuner 6 and the moving picture encoding unit 7, and creates the picture recording file A for storing moving picture data of a television program. In addition, when the moving picture control unit 2 creates the picture recording file A, it creates the property file B for storing status information that indicates a use state of the picture recording file A. Therefore, these picture recording file A and property file B are provided in pair.

The initial property setting unit 3 performs a variety of initial settings for managing status information to be stored in the property file B to be created by the picture recording control unit 2. The file list display unit 4 displays the moving picture file A in a list based on the status information stored in the property file B. The reproduction control unit 5 controls the moving picture reproduction unit 8 and the monitor display unit 9 to be driven so as to reproduce and control the picture recording file A instructed to be selected in response to a list displayed by the file list display unit 4.

The television tuner 6 captures moving picture data of a channel instructed to be selected from among a plurality of channels. The moving pictures encoding unit 7 compresses and encodes the moving picture data captured by the television tuner 6. The moving picture reproduction unit 8 decodes a moving picture of the selected picture recording file A. The monitor display unit 9 displays the moving picture decoded by the moving picture reproduction unit 8 on a monitor. Then, the timer unit 10 manages a time that this file management system defines as a reference.

Now, a principle of operation of this file management system having such configuration will be described here.

The picture recording/reproduction control unit 1 displays an operating screen simulating a remote controller on a monitor as shown in FIG. 3, for example, thereby providing a GUI (Graphical User Interface). When the user operates this GUI, and instructs picture recording of a desired television program, the picture recording/reproduction control unit 1 instructs the picture recording control unit 2 to start such picture recording at a specified time.

When picture recording is started, a signal from the television tuner 6 is encoded by the moving picture encoding unit 7 under the control of the picture recording control unit 2. Then, the encoded signal is recorded as a picture recording file A on a recording medium such as hard disk unit. In addition, at the same time of the start of recording, the picture recording control unit 2 creates a property file B for storing information (status information) added to such picture recording file A. This property file B records basic information such as picture recording start and end date and time, channel number, title, category and picture recording file name; and reproduction count or reproduction portion. FIG. 4 is a view illustrating the contents of status information recorded in this property file B. When recording is started, the picture recording control unit 2 records status information "Picture recording" in the property file B of the picture recording file A. Then, when such picture recording is stopped, the picture recording control unit 2 records status information "Recorded (Not reproduced)" in the property file of the picture recording file A.

On the other hand, when the user operates the GUI shown in FIG. 3, thereby instructing reproduction of the picture recording file A, the picture recording/reproduction control unit 1 instructs the file list display unit 4 to display a list of the image recording file A and reproduce any image recording file A instructed to be selected in response to such list display. When the user operates the GUI shown in FIG. 3, thereby instructing a file list display, the picture recording/reproduction control unit 1 instructs the file list display unit 4 to only display a list of the picture recording file A.

The file list display unit 4 that receives such instruction from the picture recording/reproduction control unit 1 acquires the status information on each picture recording file A from the property file B, and displays a list of all the picture recording files A in the form in which the user can recognize the use state of each picture recording file A indicated by such status information.

Figure 5:
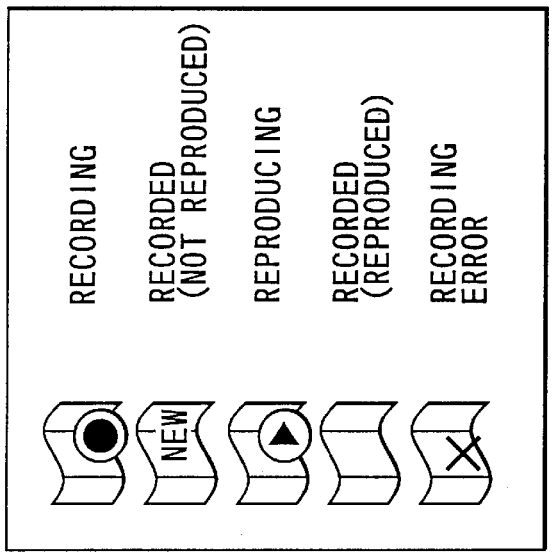
FIG. 5 is a view illustrating a plurality of icons used to display all picture recording files in a form in which a user can recognize the use state of each picture recording file in the file management system according to the first embodiment of the present invention.

FIG. 5 is a view illustrating a plurality of icons used to display a list of all the picture recording files A in the form in which the user can recognize the use state of each picture recording file A. As shown in FIG. 5, the file list display unit 4 uses available icons for each picture recording file A according to whether the use state indicated by the status information is any of "Recording", "Recorded (Not reproduced)", "Reproducing", "Recorded (Reproduced)", and "Picture recording error".

Figure 6:
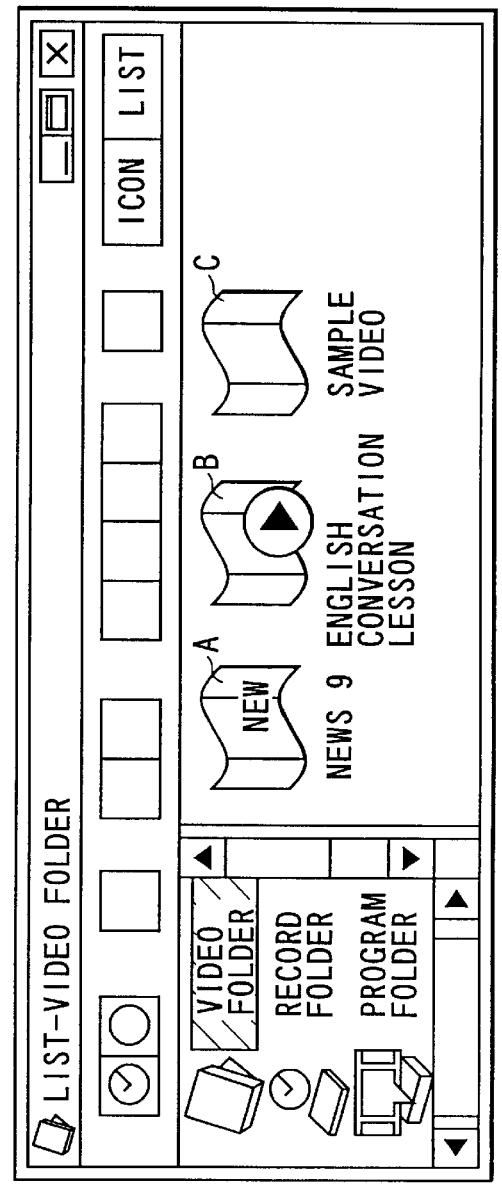
FIG. 6 is a view showing how a file list display unit of the file management system according to the first embodiment displays each moving picture file in a list.

If each property file B receives an instruction from the picture recording/reproduction control unit 1 in a state shown in FIG. 4, the file list display unit 4 displays each picture recording file A in a list, as shown in FIG. 6. Namely, in "file1. pty" that enters a state "Recorded (Not reproduced)", characters indicating a title "News 9" are displayed together with an icon for "Recorded (Not reproduced)". Then, similarly, in "file2. pty" that enters a state "Reproducing", characters indicating a title "English Conversation Lesson" are displayed together with an icon B for "Reproducing". In "file3. pty" that enters a state "Recorded (Reproduced)", characters "Sample Video" are displayed together with an icon C for "Recorded (Reproduced)".

Thus, property file B paired with each picture recording file A is provided, and the state of each picture recording file A is managed by this property file B. In this manner, unlike a conventional system, in this file management system, all the picture recording files A can be displayed in a list so that the user can grasp its use state visually, instead of arranging these files uniformly without any discrimination.

Next, if the user selectively instructs a picture recording file A that enters a state "Recorded (Not reproduced)", for example, in response to this list display, the file list display unit 4 instructs the reproduction control unit 5 to reproduce that picture recording file A. Then, the reproduction control unit 5 controls the moving picture reproduction unit 8 and monitor display unit 9 to be driven so as to reproduce the instructed picture recording file A. At this time, when the reproduction control unit 5 records status information "Reproducing" in the property file B of the picture recording file A, and such picture recording is stopped, it records status information "Recorded (Reproduced)" in the property file B of this picture recording file A.

Therefore, when the picture recording files A are displayed in a list by the file list display unit 4, an icon for "Recorded (Reproduced)" is used.

In this manner, the status information on the property file B is updated according to the use state of each picture recording file A, and the user is always presented with the update state of each picture recording file A.

In addition, by recording a reproduction portion in this property file B, for example, by reproducing only a portion that is not reproduced, it becomes possible to reproduce a "Reproduced" picture recording file A that has been reproduced part-way from its way or to repeatedly reproduce only the same scene.

Further, for example, a picture recording file A that is not reproduced and a reproduced picture recording file A containing a portion that is not reproduced are left, the other picture recording files A (namely, picture recording file A in which all the moving picture data to be stored has been reproduced) are erased in batch or a GUI for separately presenting the status information recorded in this property file B is provided, thereby making it possible to provide use with detailed information such as how many times each picture recording file A is reproduced, for example.

Now, operating procedures for this file management system will be described here with reference to FIG. 7 and FIG. 8.

Figure 7:
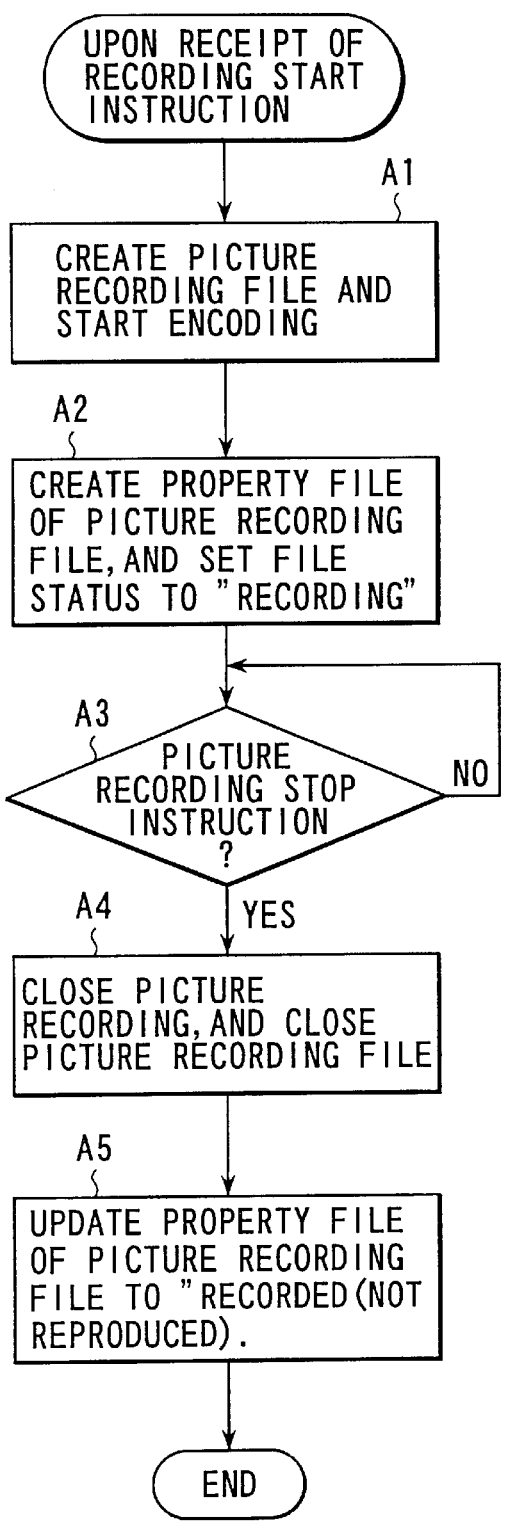
FIG. 7 is a flow chart showing operating procedures when the file management system according to the first embodiment receives an instruction for starting picture recording.

FIG. 7 is a flow chart showing the operating procedures for the file management system when the system receives an instruction for starting picture recording.

Upon the receipt of an instruction for starting picture recording, the picture recording control unit 2 creates a picture recording file A, and starts encoding the moving image data (step A1). In addition, the picture recording unit 2 creates a property file B that corresponds to the picture recording file A, and sets a file status to "Recording" (step A2).

Then, when an instruction for stopping picture recording is received (YES at the step A3), the picture recording control unit 2 stops encoding, closes the picture recording file A (step A4), and updates to "Recorded (Not reproduced)" the file status of the property file B that corresponds to the picture recording file A (step A5).

Figure 8:
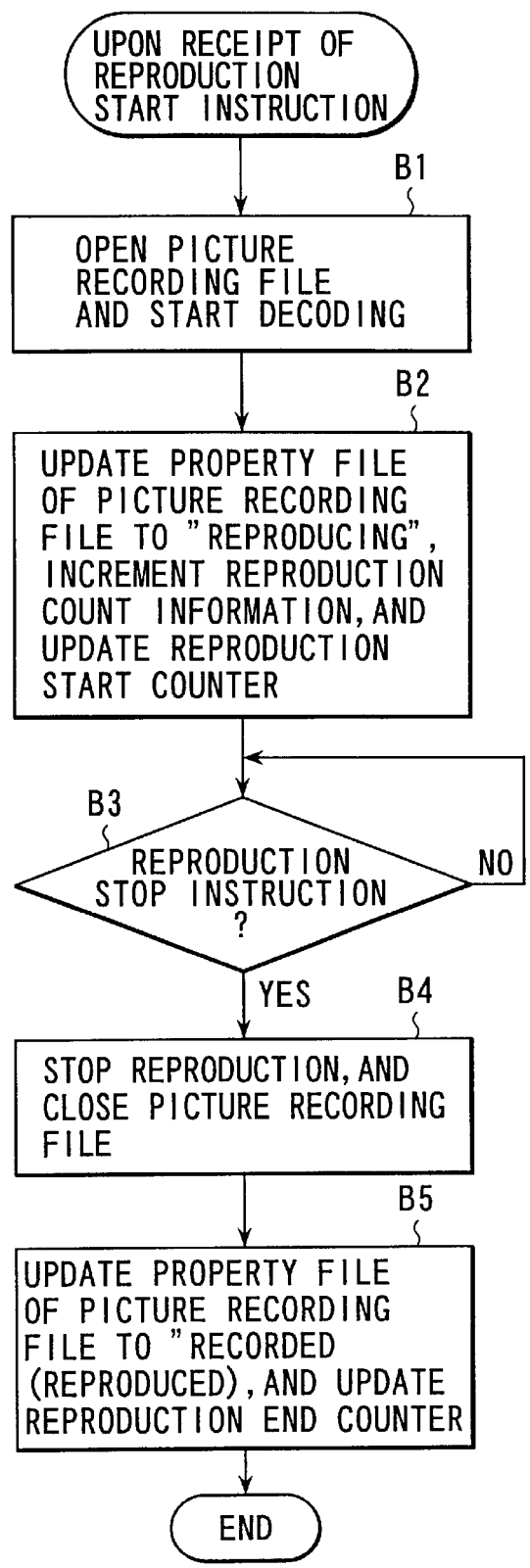
FIG. 8 is a flow chart showing operating procedures when the file management system according to the first embodiment receives an instruction for starting reproduction.

FIG. 8 is a flow chart showing the operating procedures for the file management system when the system receives an instruction for starting picture reproduction.

Upon the receipt of an instruction for starting reproduction, the reproduction control unit 5 opens a picture recording file A, and starts decoding the moving picture data (step B1). In addition, the reproduction control unit 5 updates to "Reproducing" a file status of a property file that corresponds to that picture recording file A, and executes incrementing of the reproduction count or updating of a reproduction start counter.

Then, when an instruction for stopping reproduction is received (YES at the step B3), the reproduction control unit 5 stops decoding, closes the picture recording file A (step B4), updates to "Recorded (Reproduced)" a file status of the property file B that corresponds to the picture recording file A, and executes update of a reproduction end counter (step B5).

In this manner, the use state of the picture recording file A is managed by the property file B, thereby making it possible to ensure a variety of file management activities such as displaying all the picture recording files A in a list while they are discriminated according to a use state "Not reproduced" or "Reproduced".

(Second Embodiment)

Figure 9:
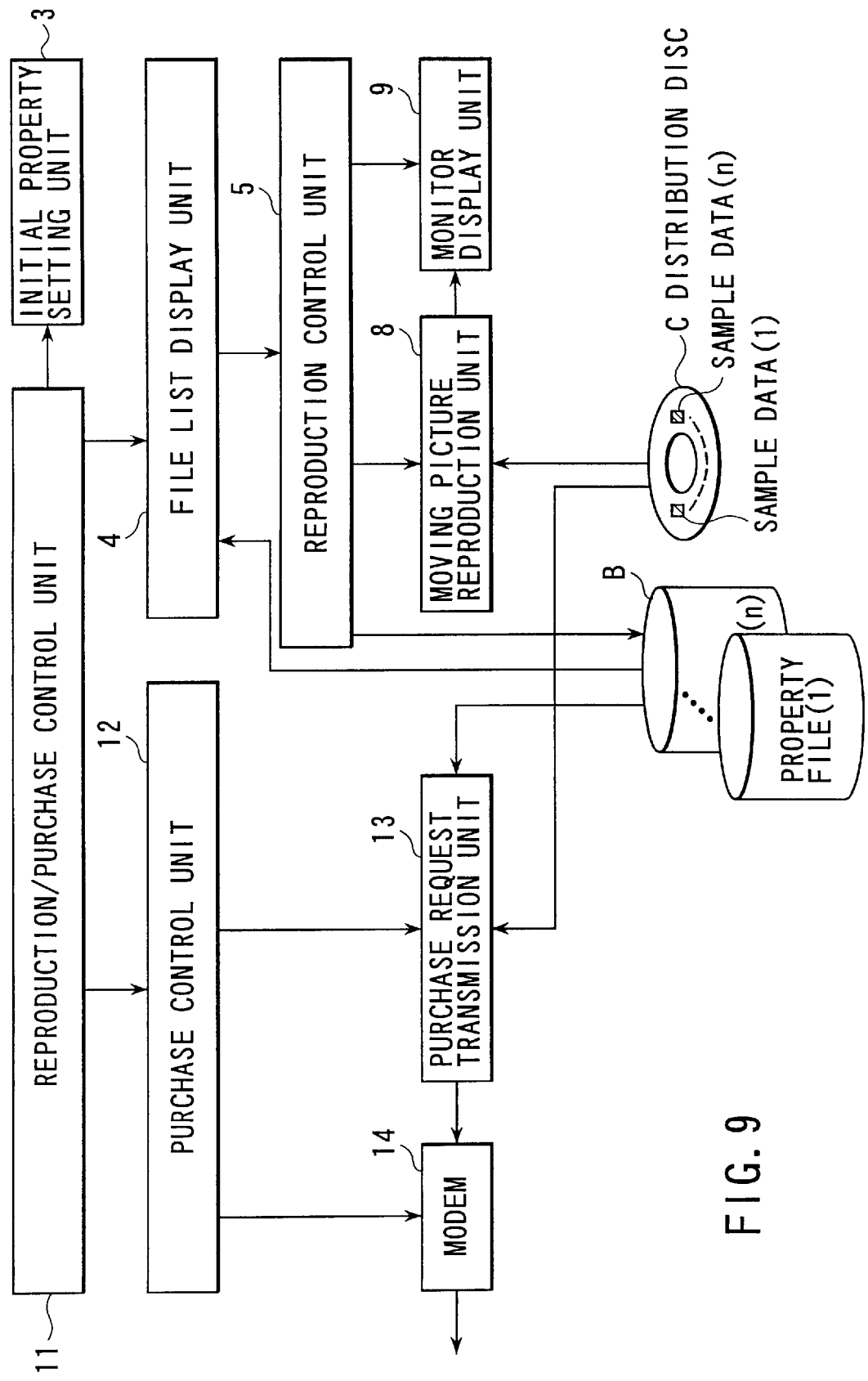
FIG. 9 is a view showing a general configuration of a status information transmission system according to a second embodiment of the present invention.

Now, a second embodiment of the present invention will be described here. FIG. 9 is view showing a general configuration of a status information transmission system according to a second embodiment.

This status information transmission system applies management technique for the use state of picture recording files in the file management system described in the first embodiment. When the reproduction states of a plurality of sample data recorded in a distribution recording medium (such as CD-ROM, for example) are managed by a property file, and this distribution destination transmits to a purchase request for the data corresponding to any sample data to a distribution source via a network, such request is transmitted together with the reproduction state of each sample data stored in that property file. Namely, this status information transmission system causes the distribution source to enable efficient acquisition of the reproduction states of a plurality of sample data recorded in the distribution recording medium.

As shown in FIG. 9, this status information transmission system comprises processing units such as a reproduction purchase control unit 11; a purchase control unit 12; a status information editing unit 13; and modem 14, instead of a picture recording/reproduction control unit 1; a picture recording control unit 2; a television tuner 6; a moving picture encoding unit 7, and timer unit 10 of the file management system shown in FIG. 2. Instead of the picture recording file A, there is employed a distribution recording medium (distribution disk C) that records a variety of sample data (herein, referred to as moving picture data).

In addition, this status information transmission system creates a property file B for storing status information that indicates the reproduction states of these sample data at a time when the system first controls each sample data to be reproduced. Then, the reproduction control unit 5 updates status information on the corresponding property file B every time the control unit controls sample data to be reproduced.

The reproduction purchase control unit 11 is a main processing unit for reproducing a variety of sample data recorded in the distribution disc C and transmitting a purchase request for the data corresponding to the sample data to the distribution source of the distribution disk C via a network such as Internet. This control unit governs control of the entire status information transmission system.

In addition, the purchase control unit 12 controls a purchase request transmission unit 13 and a modem 14 to transmit the purchase request for the user desired data and the contents of the property file B at that time to the distribution source of the distribution disk C.

The purchase request transmission unit 13 edits transmission data that consists of a data portion containing: the purchase request for the user desired data and the contents of the property file B at that time; and a header portion containing an address of the distribution source stored in the distribution disk C; and transfers the edited transmission data to the modem 14. Then, the modem 14 transmits the transmission data edited by the purchase request transmission unit 1 via a network.

When the reproduction purchase control unit 11, purchase control unit 12, initial property setting unit 3, file list display unit 4, and reproduction control unit 5 of this status information transmission system are stored as programs in the distribution disk C together with sample data, and this distribution disk C is mounted on a computer that is a distribution destination, they are configured so as to be automatically installed in that computer and activated.

As has been described above, in the file management system described in the first embodiment, the management technique of the use state of a picture recording file is applied, thereby making it possible to display the sample data recorded in the distributed recorded medium so that the user can grasp the reproduction state visually, and to ensure that the distribution source can collect the reproduction states efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A file management system for recording moving picture data in a recording medium, and reproducing the moving picture data from the recording medium, said file management system comprising:
    a picture recording file creator configured to create a picture recording file which stores received moving picture data;
    a property file creator configured to create a property file which stores status information according to a use state of the picture recording file; and
    a display control unit configured to display the picture recording file in a list, wherein the display includes:
        a filename of the picture recording file; and
        an associated icon corresponding to the status information of the picture recording file stored in the property file.

2. The file management system according to claim 1, wherein the icon displayed by the display control unit is an icon indicating one of the following: "Recording", "Recorded (Not reproduced)", "Reproducing", "Recorded (Reproduced)" or "Recording error".

3. A file management system for recording moving picture data in a recording medium, and reproducing the moving picture data from the recording medium, said file management system comprising:
    a picture recording file creator configured to create a picture recording file for writing moving picture data;
    a moving picture data writer configured to write received moving picture data in the picture recording file;
    a property file creator configured to create a property file for writing status information;
    a status information writer configured to write status information according to a use state of the picture recording file in the property file; and
    a display control unit configured to display the picture recording file in a list. wherein the display includes:
        a filename of the picture recording file; and
        an associated icon corresponding to the status information of the picture recording file stored in the property file.

4. The file management system according to claim 3, wherein the icon displayed by the display control unit is an icon indicating one of the following: "Recording", "Recorded (Not reproduced)", "Reproducing", "Recorded (Reproduced)" or "Recording error".

5. A file management method for recording moving picture data in a recording medium, and reproducing the moving picture data from the recording medium, said file management method comprising:
    creating a picture recording file which stores received moving picture data;
    creating a property file which stores status information according to a use state of the picture recording file; and
    displaying the picture recording file in a list, wherein the display includes:
        a filename of the picture recording file; and
        an associated icon corresponding to the status information of the picture recording file stored in the property file.

6. The file management method according to claim 5, wherein the icon displayed is an icon indicating one of the following: "Recording", "Recorded (Not reproduced)", "Reproducing", "Recorded (Reproduced)" or "Picture recording error".

7. A file management method for recording moving picture data in a recording medium, and reproducing the moving picture data from the recording medium, said file management method comprising:
    creating a picture recording file for writing moving picture data;
    writing received moving picture data in the picture recording file;
    creating a property file for writing status information;
    writing status information according to a use state of the picture recording file in the property file; and
    displaying the picture recording file in a list, wherein the display includes:
        a filename of the picture recording file; and
        an associated icon corresponding to the status information of the picture recording file stored in the property file.

8. The file management method according to claim 7, wherein the icon displayed is an icon indicating one of the following: "Recording", "Recorded (Not reproduced)", "Reproducing", "Recorded (Reproduced )" or "Picture recording error".

* * * * *